(12) United States Patent
Chen

(10) Patent No.: US 10,403,237 B2
(45) Date of Patent: Sep. 3, 2019

(54) PROCESSING METHOD AND DEVICE FOR MULTI-SCREEN SPLICING DISPLAY

(71) Applicant: HUAWEI TECHNOLOGIES CO., LTD., Shenzhen, Guangdong (CN)

(72) Inventor: Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 133 days.

(21) Appl. No.: 15/618,754

(22) Filed: Jun. 9, 2017

(65) Prior Publication Data

US 2017/0278485 A1  Sep. 28, 2017

Related U.S. Application Data

(63) Continuation of application No. PCT/CN2015/095697, filed on Nov. 26, 2015.

(30) Foreign Application Priority Data

Dec. 11, 2014 (CN) .......................... 2014 1 0765262

(51) Int. Cl.
  *G09G 5/14* (2006.01)
  *G09G 5/12* (2006.01)
  *G09G 5/399* (2006.01)
  *G06F 3/14* (2006.01)
  *G09G 5/39* (2006.01)

(52) U.S. Cl.
  CPC ................. *G09G 5/14* (2013.01); *G06F 3/14* (2013.01); *G06F 3/1423* (2013.01);
  (Continued)

(58) Field of Classification Search
  CPC ....... G06F 3/14; G06F 3/1423–3/1446; G09G 5/12–5/14; G09G 5/36;
  (Continued)

(56) References Cited

U.S. PATENT DOCUMENTS 4,928,253 A * 5/1990 Yamauchi ................. G06T 1/60
  345/537
6,154,225 A * 11/2000 Kou ....................... G06F 3/1438
  345/213
(Continued)

FOREIGN PATENT DOCUMENTS

CN  101256762 A  9/2008
CN  103269416 A  8/2013
(Continued)

OTHER PUBLICATIONS

Extended European Search Report dated Oct. 30, 2017 in corresponding European Patent Application No. 15866764.2.
(Continued)

*Primary Examiner* — Nathan Danielsen
(74) *Attorney, Agent, or Firm* — Staas & Halsey LLP

(57) ABSTRACT

A processing method and device for multi-screen splicing display are disclosed. The method includes: receiving instruction information for multi-screen splicing display, where the instruction information is used to instruct to splice at least two physical display screens for display; sending, according to the instruction information, display data to a video RAM of a virtual display screen formed by splicing the at least two physical display screens, where a size of the video RAM of the virtual display screen corresponds to a size of the virtual display screen; dividing the display data into at least two data blocks that correspond to sizes of the at least two physical display screens, and respectively sending the data blocks obtained by division to video RAMs of corresponding physical display screens.

12 Claims, 6 Drawing Sheets

(52) U.S. Cl.
CPC ............ *G06F 3/1446* (2013.01); *G09G 5/12* (2013.01); *G09G 5/39* (2013.01); *G09G 5/399* (2013.01); *G09G 2300/026* (2013.01); *G09G 2310/0232* (2013.01); *G09G 2340/0407* (2013.01); *G09G 2340/0485* (2013.01); *G09G 2360/18* (2013.01)

(58) Field of Classification Search
CPC .... G09G 5/39–5/399; G09G 2300/026; G09G 2310/0232; G09G 2340/04–2340/0442; G09G 2340/0464–2340/0485; G09G 2360/12–2360/127; G09G 2360/18
See application file for complete search history.

(56) References Cited

U.S. PATENT DOCUMENTS

| | | |
|---|---|---|
| 2001/0022587 A1 | 9/2001 | Ono |
| 2002/0030694 A1* | 3/2002 | Ebihara .................... G06T 1/20 345/634 |
| 2004/0150581 A1* | 8/2004 | Westerinen ........... G06F 1/1601 345/1.3 |
| 2013/0208417 A1 | 8/2013 | Sirpal |
| 2014/0184628 A1 | 7/2014 | Lee |

FOREIGN PATENT DOCUMENTS

| | | |
|---|---|---|
| CN | 103309639 A | 9/2013 |
| CN | 104182194 A | 12/2014 |

OTHER PUBLICATIONS

International Search Report dated Feb. 29, 2016 in corresponding International Patent Application No. PCT/CN2015/095697.
International Search Report dated Feb. 29, 2016 in corresponding International Application No. PCT/CN2015/095697.

* cited by examiner

PROCESSING METHOD AND DEVICE FOR MULTI-SCREEN SPLICING DISPLAY

CROSS-REFERENCE TO RELATED APPLICATIONS

This application is a continuation of International Application No. PCT/CN2015/095697, filed on Nov. 26, 2015, which claims priority to Chinese Patent Application No. 201410765262.7, filed on Dec. 11, 2014. The disclosures of the aforementioned applications are hereby incorporated by reference in their entireties.

TECHNICAL FIELD

The present application relates to the display processing technologies, and in particular, to a processing method and device for multi-screen splicing display.

BACKGROUND

Splicing multiple display screens in a foldable manner is a development direction of display devices in the future. For example, there may be dual-screen foldable mobile phones, or a mode in which three or even more screens are spliced in a foldable manner.

In current multi-screen display solutions, two or more display screens are used as completely independent devices, and an application program directly selects specified one or more display screens to perform display processing. For example, although an outer shape of a mobile phone named Medias designed by Nippon Electric Company Limited (Nippon Electric Company Limited, NEC for short) is obtained by splicing two screens in a foldable manner, actual display processing is performed separately by using two display screens as two display screens independent of each other.

In the prior art, two or more display screens are used as completely independent devices in a display processing process, and an application program directly selects specified one or more display screens to perform display processing. For an existing multi-screen display processing process, refer to FIG. 1, and FIG. 1 is a schematic diagram of the existing multi-screen display processing process. It can be seen from FIG. 1 that an application program needs to support multi-screen display, so as to implement multi-screen display. That is, the application program needs to be able to directly invoke two or more display interfaces, and directly implement image drawing and image output on the display interfaces. Even if the application program can directly invoke the two or more display interfaces, final display results are still separately displayed by each display screen for the application program, that is, same final images are displayed by a display screen A and a display screen B.

However, currently, most application programs are designed for a single display screen. Consequently, it is difficult to implement multi-screen splicing display for an image on a multi-screen display device.

SUMMARY

The present invention provides a processing method and device for multi-screen splicing display, so as to resolve a problem that an application program cannot implement multi-screen splicing display for an image on a multi-screen display device in an existing display processing technology.

According to a first aspect, a processing method for multi-screen splicing display is provided, including:

receiving instruction information for multi-screen splicing display, where the instruction information is used to instruct to splice at least two physical display screens for display;

sending, according to the instruction information, display data to a video RAM of a virtual display screen formed by splicing the at least two physical display screens, where a size of the video RAM of the virtual display screen corresponds to a size of the virtual display screen;

dividing the display data into at least two data blocks that correspond to sizes of the at least two physical display screens, and respectively sending the data blocks obtained by division to video RAMs of corresponding physical display screens; and outputting the data blocks received in the video RAMs of the at least two physical display screens to display hardware that corresponds to the at least two physical display screens for display.

With reference to the first aspect of the embodiments of the present invention, in a possible implementation manner, the method further includes:

before the sending, according to the instruction information, display data to a video RAM of a virtual display screen formed by splicing the at least two physical display screens, obtaining parameter information of the virtual display screen, where the parameter information of the virtual display screen includes the size of the virtual display screen and video RAM information of the virtual display screen.

Further, in a possible implementation manner, the video RAM of the virtual display screen includes a buffer, and the sending display data to a video RAM of the virtual display screen specifically includes: sending the display data to the buffer sequentially according to a frame sequence of the display data.

Further, in a possible implementation manner, the buffer includes at least two buffer units, where the at least two buffer units have a same size; and the sending the display data to the buffer sequentially specifically includes: alternately sending display data that corresponds to each frame of the display data to the at least two buffer units according to the frame sequence of the display data.

Further, in a possible implementation manner, the respectively sending the data blocks obtained by division to video RAMs of corresponding physical display screens specifically includes: determining any one of frame synchronization signals of the at least two physical display screens as a frame synchronization signal of the virtual display screen, and respectively sending, according to the frame synchronization signal of the virtual display screen, each piece of display data in the at least two buffer units to a video RAM of a corresponding physical display screen.

Further, in another possible implementation manner, the determining any one of frame synchronization signals of the at least two physical display screens as a frame synchronization signal of the virtual display screen specifically includes: determining, in the frame synchronization signals of the at least two physical display screens, a frame synchronization signal with a higher frequency as the frame synchronization signal of the virtual display screen, and respectively sending, according to the frame synchronization signal of the virtual display screen, each piece of display data in the at least two buffer units to a video RAM of a corresponding physical display screen.

With reference to the first aspect of the embodiments of the present invention, in another possible implementation manner, after the obtaining parameter information of the virtual display screen, the method further includes: obtaining, according to the parameter information of the virtual display screen, that a size of a first virtual display screen is a first resolution, and a video RAM of the first virtual display screen is a first video RAM, where a size of the first video RAM corresponds to the first resolution, and the first resolution is less than that of the virtual display screen; and the sending display data to a video RAM of a virtual display screen formed by splicing the at least two physical display screens specifically includes: sending the display data to the first video RAM, and compiling the display data in the first video RAM to a central area of the virtual display screen.

Further, in a possible implementation manner, after the compiling the image data in the first video RAM to a central area of the virtual display screen, the method further includes: adding preset background display data to a video RAM that corresponds to an area outside the central area of the virtual display screen.

According to a second aspect, a processing device for multi-screen splicing display is provided, including a processor, where the processor includes:

a receiving module, configured to: receive instruction information for multi-screen splicing display, where the instruction information is used to instruct to splice at least two physical display screens for display, and send the instruction information to a processing module;

the processing module, configured to send, according to the instruction information, display data to a video RAM of a virtual display screen formed by splicing the at least two physical display screens, where a size of the video RAM of the virtual display screen corresponds to a size of the virtual display screen, where the processing module is further configured to: divide the display data into at least two data blocks that correspond to sizes of the at least two physical display screens, and respectively send the data blocks obtained by division to video RAMs of corresponding physical display screens; and a display module, configured to output the data blocks received in the video RAMs of the at least two physical display screens to display hardware that corresponds to the at least two physical display screens for display.

With reference to the second aspect of the embodiments of the present invention, in another possible implementation manner, the receiving module is further configured to: before the display data is sent, according to the instruction information, to the video RAM of the virtual display screen formed by splicing the at least two physical display screens, obtain parameter information of the virtual display screen, where the parameter information of the virtual display screen includes the size of the virtual display screen and video RAM information of the virtual display screen.

Further, in a possible implementation manner, the video RAM of the virtual display screen includes a buffer, and the processing module is specifically configured to send the display data to the buffer sequentially according to a frame sequence of the display data.

Further, in a possible implementation manner, the buffer includes at least two buffer units, where the at least two buffer units have a same size; and the processing module is specifically configured to alternately send display data that corresponds to each frame of the display data to the at least two buffer units according to the frame sequence of the display data.

Further, in a possible implementation manner, the processing module is specifically configured to: determine any one of frame synchronization signals of the at least two physical display screens as a frame synchronization signal of the virtual display screen, and respectively send, according to the frame synchronization signal of the virtual display screen, each piece of display data in the at least two buffer units to a video RAM of a corresponding physical display screen.

Further, in a possible implementation manner, the processing module is specifically configured to: determine, in the frame synchronization signals of the at least two physical display screens, a frame synchronization signal with a higher frequency as the frame synchronization signal of the virtual display screen, and respectively send, according to the frame synchronization signal of the virtual display screen, each piece of display data in the at least two buffer units to a video RAM of a corresponding physical display screen.

With reference to the second aspect of the embodiments of the present invention, in another possible implementation manner, the receiving module is further configured to: after obtaining the parameter information of the virtual display screen, obtain, according to the parameter information of the virtual display screen, that a size of a first virtual display screen is a first resolution, and a video RAM of the first virtual display screen is a first video RAM, where a size of the first video RAM corresponds to the first resolution, and the first resolution is less than that of the virtual display screen; and the processing module is specifically configured to: send the display data to the first video RAM, and compile the display data in the first video RAM to a central area of the virtual display screen.

Further, in a possible implementation manner, the processing module is further configured to add preset background display data to a video RAM that corresponds to an area outside the central area of the virtual display screen.

Based on the foregoing technical solutions, in the embodiments of the present invention, when multiple screens are spliced for display, parameters reported to an application are changed into parameters of a virtual display screen, and a corresponding video RAM address is switched to a video RAM address of the virtual display screen, so that the application program implements multi-screen splicing display for an image on the multiple screens.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The processing method for multi-screen splicing display provided in the embodiments of the present invention may specifically be applied to a process for stitching images for display, and is applicable to a multi-screen electronic device, for example, a device such as a multi-screen foldable mobile phone, a multi-screen foldable computer, a foldable television, or a foldable electronic album. The processing process may be performed by a data processing system, for example, a CPU in the foregoing device.

Figure 1:
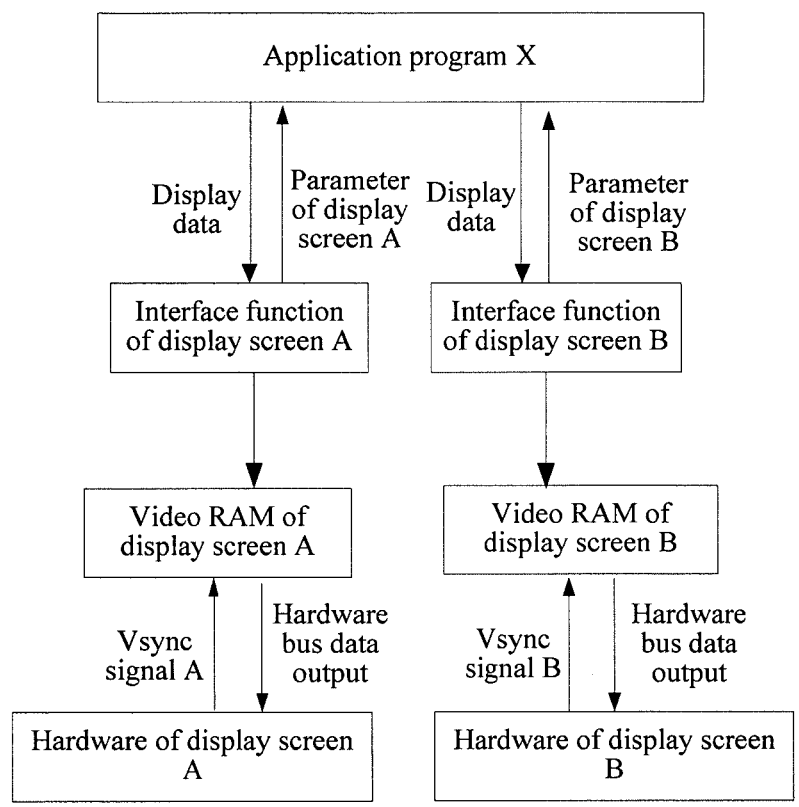
FIG. 1 is a schematic diagram of an existing multi-screen display processing process.
Figure 2:
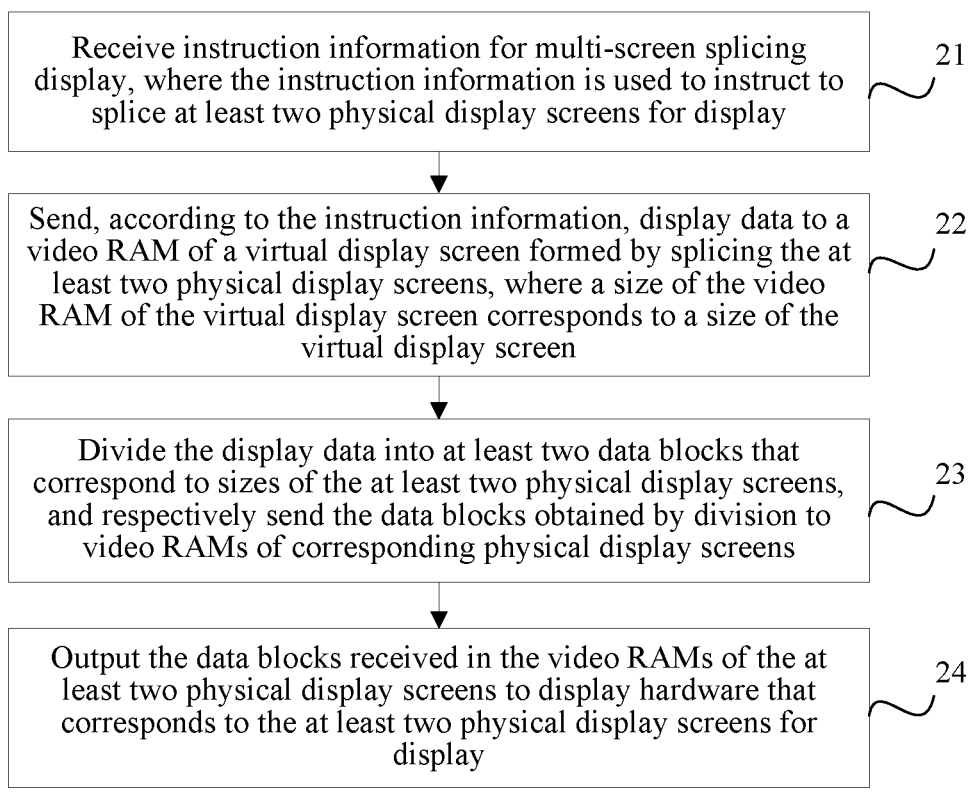
FIG. 2 is a flowchart of an embodiment of a processing method for multi-screen splicing display according to the present invention.

FIG. 2 is a flowchart of an embodiment of a processing method for multi-screen splicing display according to the present invention. The method includes:

Step 21. Receive instruction information for multi-screen splicing display, where the instruction information is used to instruct to splice at least two physical display screens for display.

Step 22. Send, according to the instruction information, display data to a video RAM of a virtual display screen formed by splicing the at least two physical display screens, where a size of the video RAM of the virtual display screen corresponds to a size of the virtual display screen.

Step 23. Divide the display data into at least two data blocks that correspond to sizes of the at least two physical display screens, and respectively send the data blocks obtained by division to video RAMs of corresponding physical display screens.

Step 24. Output the data blocks received in the video RAMs of the at least two physical display screens to display hardware that corresponds to the at least two physical display screens for display.

In this embodiment, specifically, a detailed description is given by using an example in which two physical display screens are spliced for display. The two physical display screens are respectively marked as a display screen A and a display screen B. It may be understood that when an electronic device has three or more display screens, principles for stitching images for display are the same. Therefore, processing for three or more display screens is not further described in this embodiment.

Optionally, for example, the instruction information may be triggered by a user of an electronic device by performing an operation such as flipping or lighting another display screen, or selecting a multi-screen mode in an option menu displayed by an application program. The instruction information includes: a quantity of display screens that need to be spliced and sizes of the display screens. For example, two display screens need to be spliced, or three display screens need to be spliced, or even more screens need to be spliced. The instruction information may further include a manner of splicing the multiple display screens, for example, top-bottom (longitudinal) splicing, or left-right (transverse) splicing.

In this embodiment, a virtual display screen is defined as a display screen formed by splicing the display screen A and the display screen B. A size of the virtual display screen is a sum of sizes of the two physical display screens. For example, if the sizes of the two physical display screens are both 1024*768, the size of the virtual display screen is 1536*1024. According to the size of the virtual display screen, corresponding storage space in a memory may be allocated to be a video RAM that corresponds to the virtual display screen.

Figure 3:
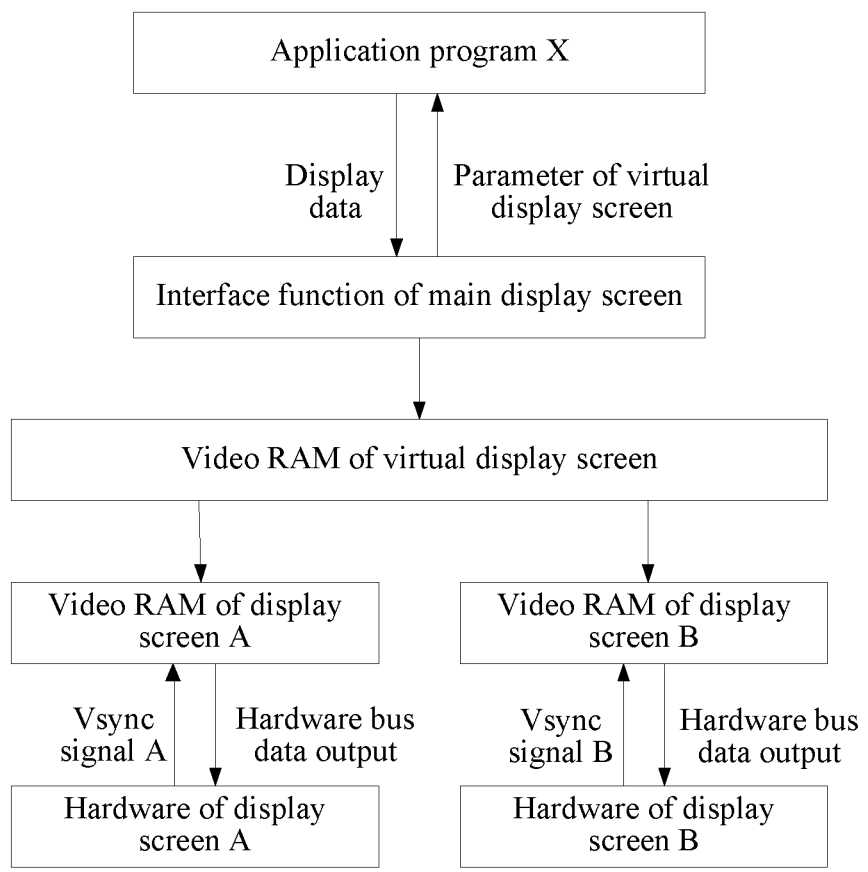
FIG. 3 is a schematic diagram of a display processing process for splicing multiple screens according to the present invention.

FIG. 3 is a schematic diagram of a display processing process for splicing multiple screens according to the present invention. Referring to FIG. 3, in a processing method for multi-screen splicing display provided in this embodiment, when a display screen A and a display screen B need to be spliced for display, a user of an electronic device may perform an operation such as flipping or lighting another display screen, or selecting a multi-screen mode in an option menu displayed by an application program, to trigger instruction information for multi-screen splicing display. After receiving the instruction information, a data processing system only needs to change parameters reported to the application program into parameters of a virtual display screen, and switches a corresponding video RAM address to a video RAM address of the virtual display screen.

Next, the application program sends display data to a video RAM that corresponds to the virtual display screen. The data processing system then divides corresponding display data in the video RAM of the virtual display screen into two parts, and sends respectively the two parts to video RAMs that correspond to the display screen A and the display screen B. On one hand, when the instruction information instructs to splice the two display screens transversely, the application program transversely draws an image in the video RAM that corresponds to the virtual display screen, then divides the image drawn in the video RAM of the virtual display screen into two parts: the left part and the right part, copies data that corresponds to the image on the left part to the video RAM that corresponds to the display screen A, and copies data that corresponds to the image on the right part to the video RAM that corresponds to the display screen B. For example, if data corresponding to the image drawn in the video RAM of the virtual display screen is [M N], where M and N represent two data blocks, the data block M is copied to the video RAM that corresponds to the display screen A, and the data block N is copied to the video RAM that corresponds to the display screen B. On the other hand, when the instruction information instructs to splice the two display screen longitudinally, the application program longitudinally draws an image in the video RAM that corresponds to the virtual display screen, then divides the image drawn in the video RAM of the virtual display screen into two parts: the upper part and the lower part, copies data that corresponds to the image on the upper part to the video RAM that corresponds to the display screen A, and copies data that corresponds to the image on the lower part to the video RAM that corresponds to the display screen B. It should be noted that the data processing system simultaneously copies the data block M to the video RAM that corresponds to the display screen A, and copies the data block N to the video RAM that corresponds to the display screen B.

Finally, the data received in the video RAM of the display screen A is output to display hardware that corresponds to the display screen A for display. Similarly, the data received in the video RAM of the display screen B is output to display hardware that corresponds to the display screen B. In a preferred implementation manner, step 24 may be implemented by using an existing image display solution, and is not limited in this embodiment.

In the processing method for multi-screen splicing display provided in this embodiment, when multiple screens are spliced for display, parameters reported to an application are changed into parameters of a virtual display screen, and a corresponding video RAM address is switched to a video RAM address of the virtual display screen, so that the application program can implement multi-screen splicing display for an image on the multiple screens.

Figure 4:
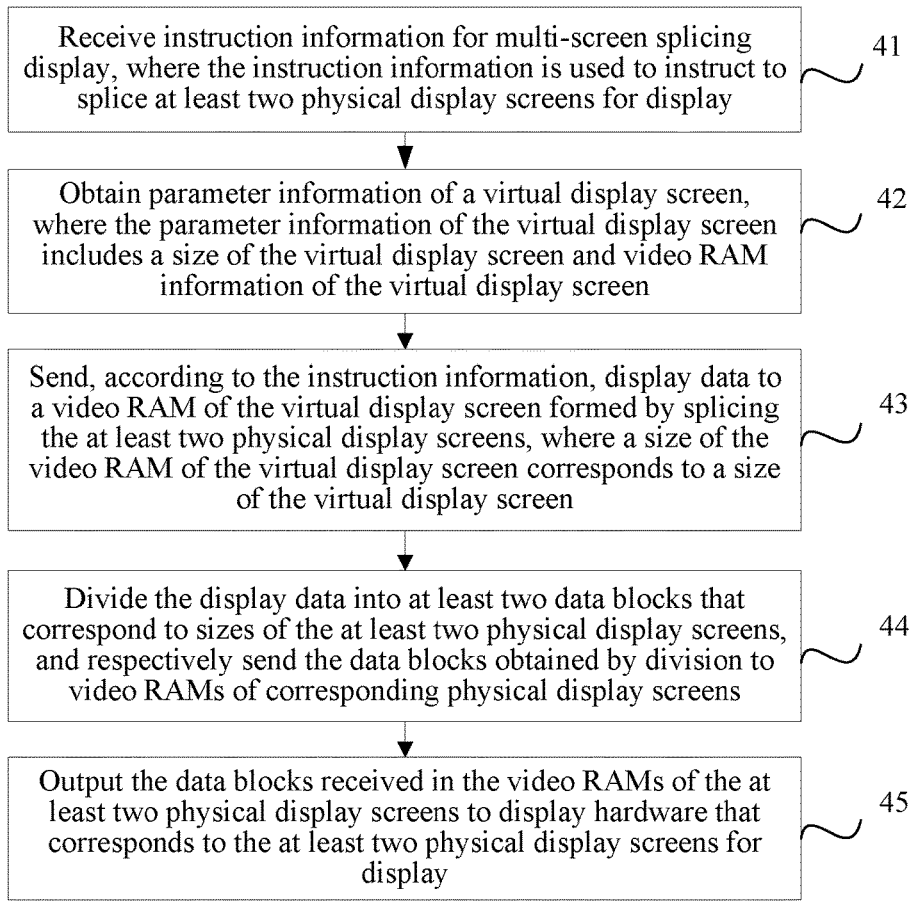
FIG. 4 is a flowchart of another embodiment of a processing method for multi-screen splicing display according to the present invention.

FIG. 4 is a flowchart of another embodiment of a processing method for multi-screen splicing display according to the present invention. In the processing method for multi-screen splicing display provided in this embodiment, on the basis of the embodiment shown in FIG. 2, before the sending, according to the instruction information, display data to a video RAM of a virtual display screen formed by splicing the at least two physical display screens, parameter information of the virtual display screen further needs to be obtained. The parameter information of the virtual display screen includes a size of the virtual display screen and video RAM information of the virtual display screen.

As shown in FIG. 4, the processing method for multi-screen splicing display provided in this embodiment includes:

Step 41. Receive instruction information for multi-screen splicing display, where the instruction information is used to instruct to splice at least two physical display screens for display.

Step 42. Obtain parameter information of a virtual display screen, where the parameter information of the virtual display screen includes a size of the virtual display screen and video RAM information of the virtual display screen.

Step 43. Send, according to the instruction information, display data to a video RAM of the virtual display screen formed by splicing the at least two physical display screens, where a size of the video RAM of the virtual display screen corresponds to a size of the virtual display screen.

Step 44. Divide the display data into at least two data blocks that correspond to sizes of the at least two physical display screens, and respectively send the data blocks obtained by division to video RAMs of corresponding physical display screens.

Step 45. Output the data blocks received in the video RAMs of the at least two physical display screens to display hardware that corresponds to the at least two physical display screens for display.

When multiple screens need to be spliced for display, a user of an electronic device may perform an operation such as flipping or lighting another display screen, or selecting a multi-screen mode in an option menu displayed by an application program, to trigger instruction information for multi-screen splicing display. After receiving the instruction information, a data processing system allocates corresponding storage space as a video RAM that corresponds to the virtual display screen, and switches a main display screen to the virtual display screen according to the instruction information; and then obtains parameter information of the virtual display screen according to the instruction information and the allocated video RAM of the virtual display screen, where the parameter information includes the size of the virtual display screen and video RAM information of the virtual display screen, and then reports the parameter information of the virtual display screen to an application program that will perform display, and switches a corresponding video RAM address to a video RAM address of the virtual display screen. In this case, the application program sends display data to a corresponding interface function of the main display screen of the current system, that is, the application program sends, by using the corresponding interface function of the main display screen of the current system, the display data to the video RAM that corresponds to the virtual display screen.

During the processing process for displaying image data, the video RAM may include a buffer, and the display data may be sequentially sent to the buffer according to a frame sequence of the display data. In this way, a transition function is achieved during the processing process for displaying image data, thereby ensuring smooth image display.

Figure 5:
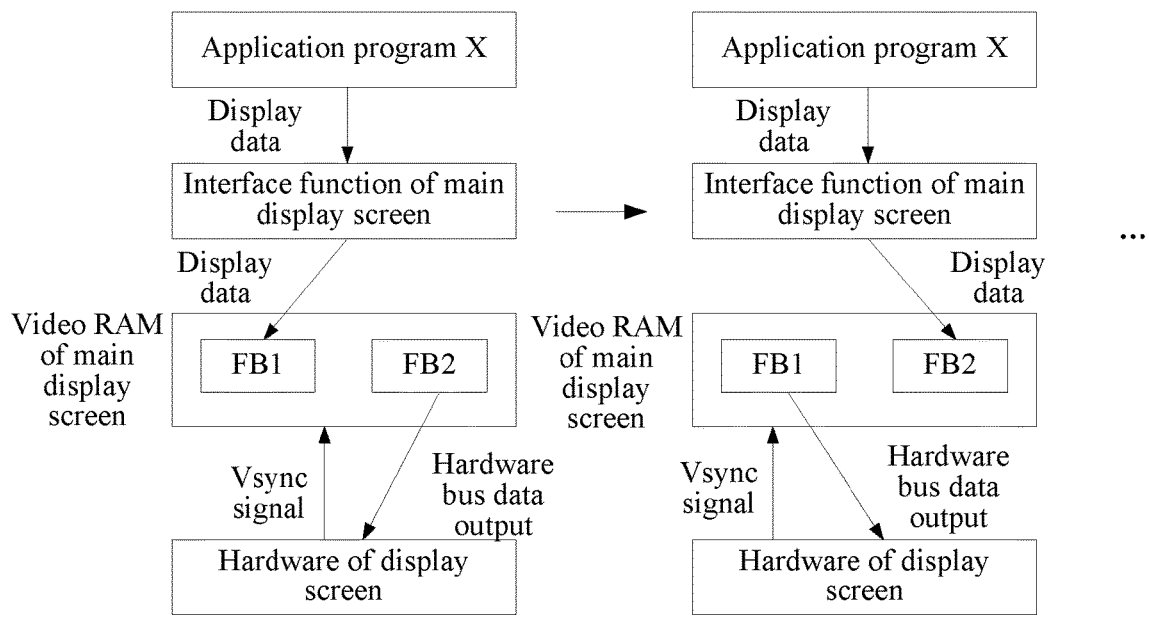
FIG. 5 is a schematic diagram of a processing process for an image data frame.

FIG. 5 is a schematic diagram of a processing process for an image data frame. Referring to FIG. 5, it can be seen from FIG. 5 that a video RAM may actually not be a memory having a same size as that of a resolution of a display screen, but may include multiple frame buffers (frame buffer, FB for short) having a same size, for example, include two or three, or even more FBs. More FBs indicate smoother display. Then, data of each frame of the display data is alternately sent to the FBs according to a frame sequence of the display data, to ensure that when at least one FB bears display data transferred downwards by an application layer, another FB has stored in advance display data of a previous frame, so that the display data can be transmitted to display screen hardware simultaneously, thereby ensuring smooth image display. During the processing process for an image data frame shown in FIG. 5, a frame synchronization (Vsync) signal is a synchronization hardware signal on the display screen hardware, and indicates that the display screen hardware has displayed data of a frame, and that a system may transmit data of a next frame to the display screen hardware by using a hardware bus. Alternatively, it may be understood that the Vsync signal is a switching signal indicating that the system performs switching between FB1 and FB2 to use one for input (an application program inputs data to the video RAM), and use the other for output (output data to the display screen hardware). When the video RAM is divided into three or even more FBs, data display principles are the same, and are not described in detail again.

Similarly, in this embodiment, the video RAM of the virtual display screen includes at least two buffer units, that is, the foregoing FBs, and the at least two buffer units have a same size.

Further, in step 43, the sending display data to a video RAM of a virtual display screen formed by splicing the at least two physical display screens may specifically include the following step:

alternately sending display data that corresponds to each frame of the display data to the at least two buffer units according to the frame sequence of the display data.

Figure 6:
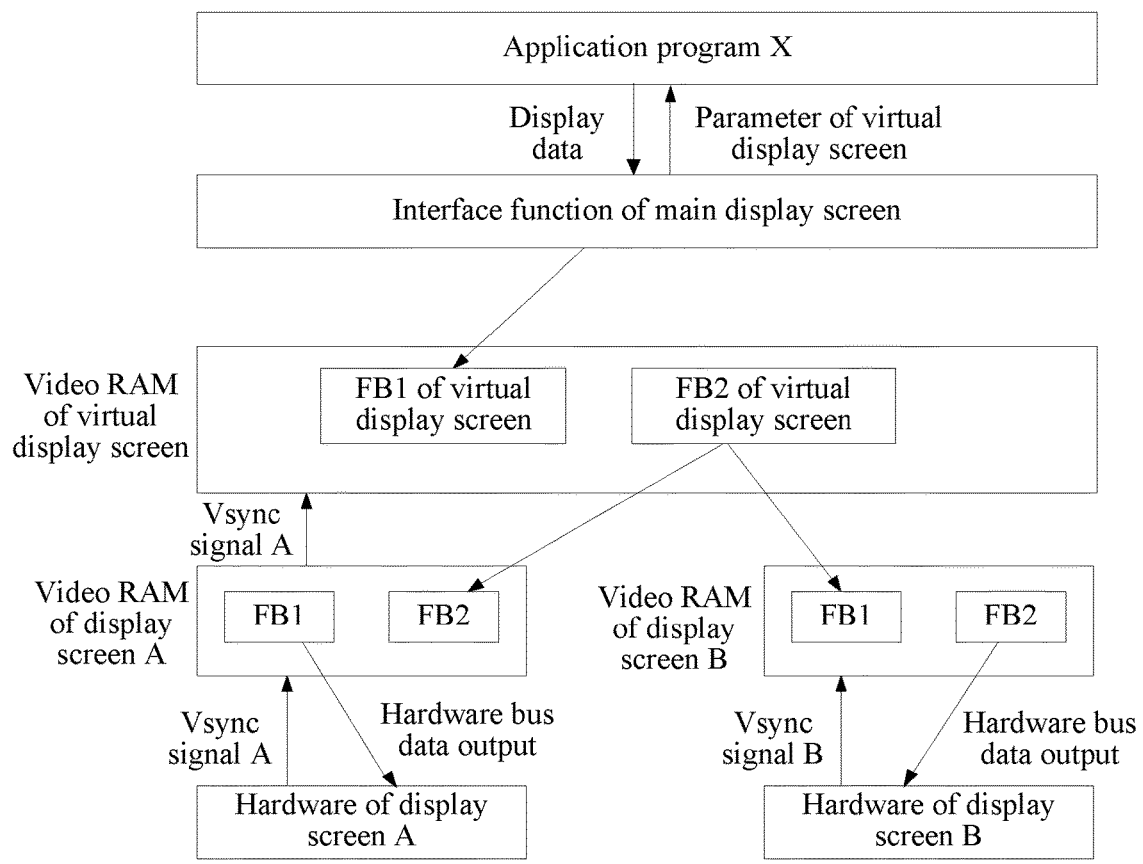
FIG. 6 is a schematic diagram of a processing process for an image data frame in a processing method for multi-screen splicing display according to the present invention.

Referring to FIG. 6, FIG. 6 is a schematic diagram of a processing process for an image data frame in a processing method for multi-screen splicing display according to the present invention. In this embodiment, similarly, a detailed description is given by using an example in which two physical display screens are spliced for display in a foldable manner. The two physical display screens are respectively marked as a display screen A and a display screen B.

When the display screen A and the display screen B need to be spliced for display, there are two Vsync signals. To ensure smooth image display, it needs to be ensured that the two Vsync signals are triggered nearly simultaneously. This is equivalent to that a Vsync signal A and a Vsync signal B become one Vsync signal, and the Vsync signal is used as a Vsync signal of the virtual display screen. However, to ensure that the Vsync signal A and the Vsync signal B are triggered simultaneously, the following conditions need to be satisfied: 1) Resolutions of the two display screens are completely the same; 2) Self-refresh frequencies set for the two display screens are completely the same, and a problem of frequency offset does not exist; 3) The two display screens simultaneously start and complete an initialization operation. Although the foregoing conditions can be satisfied, multiple limitations are brought to a design of an electronic device. In addition, in a scenario in which the display screen B is flipped for lighting when the display screen A displays and the display screen B sleeps, because the display screen A and the display screen B do not simultaneously start and complete the initialization operation, the Vsync signals cannot be synchronous. That is, the foregoing conditions cannot be satisfied.

In an optional implementation manner of this embodiment, a data processing system determines either of the Vsync signal A that corresponds to the display screen A or the Vsync signal B that corresponds to the display screen B as the Vsync signal of the virtual display screen. For example, the Vsync signal A is determined as the Vsync signal of the virtual display screen, and then data of current frames in FB1 and FB2 of the virtual display screen is respectively sent to video RAMs of corresponding physical display screens according to the Vsync signal A.

It should be noted that by selecting either of the Vsync signal A and the Vsync signal B as the Vsync signal of the virtual display screen, for example, selecting the Vsync signal A as the Vsync signal of the virtual display screen, when the Vsync signal of the display screen B is sent to a corresponding FB to make the video RAM of the display screen B to implement FB switching, an action of moving data from the FB of the video RAM of the virtual display screen to the video RAM of the display screen B is triggered. If the Vsync signal A and the Vsync signal B have same frequencies, and only opportunities are not the same, there is no problem. This is because image display times of the two screens have a difference of only a few milliseconds, which cannot be recognized by human eyes at all. However, if the Vsync signal A has a frequency higher than a frequency of the Vsync signal B, the Vsync signal B may not be triggered in a display period of a Vsync signal A. Consequently, no data is moved to the display screen B, that is, data displayed on the display screen B is one frame less than that displayed on the display screen A. However, because a frame display frequency is very high (for example, 60 Hz per second), and a next frame is quickly shown for compensation, a frame data difference cannot be easily perceived by human eyes. If the Vsync signal A has a frequency slower than a frequency of the Vsync signal B, after the Vsync signal B is triggered, moved data is data of a previous frame that has been displayed by using the Vsync signal B. This cannot be perceived by human eyes either, and therefore does not matter.

Further, in a preferred implementation manner of this embodiment, the system may further determine, in the Vsync signal A that corresponds to the display screen A and the Vsync signal B that corresponds to the display screen B, a Vsync signal with a higher frequency as the Vsync signal of the virtual display screen. Specifically, the system may first identify frequencies of both the Vsync signal A and the Vsync signal B, then select the Vsync signal with a higher frequency as the Vsync signal of the virtual display screen, and then send respectively, according to the selected Vsync signal, data of current frames in FB1 and FB2 of the virtual display screen to the video RAMs of corresponding physical display screens.

In the processing method for multi-screen splicing display provided in this embodiment, when multiple screens are spliced for display, parameters reported to an application are changed into parameters of a virtual display screen, and a corresponding video RAM address is switched to a video RAM address of the virtual display screen, so that the application program can implement multi-screen splicing display for an image on the multiple screens. Further, by selecting a Vsync signal of either of the display screens as the Vsync signal of the virtual display screen, or by selecting, in the Vsync signals that correspond to the display screens, a Vsync signal with a higher frequency as the Vsync signal of the virtual display screen, display data can be accurately output, thereby ensuring that an image can be displayed smoothly by splicing multiple screens.

Figure 7:
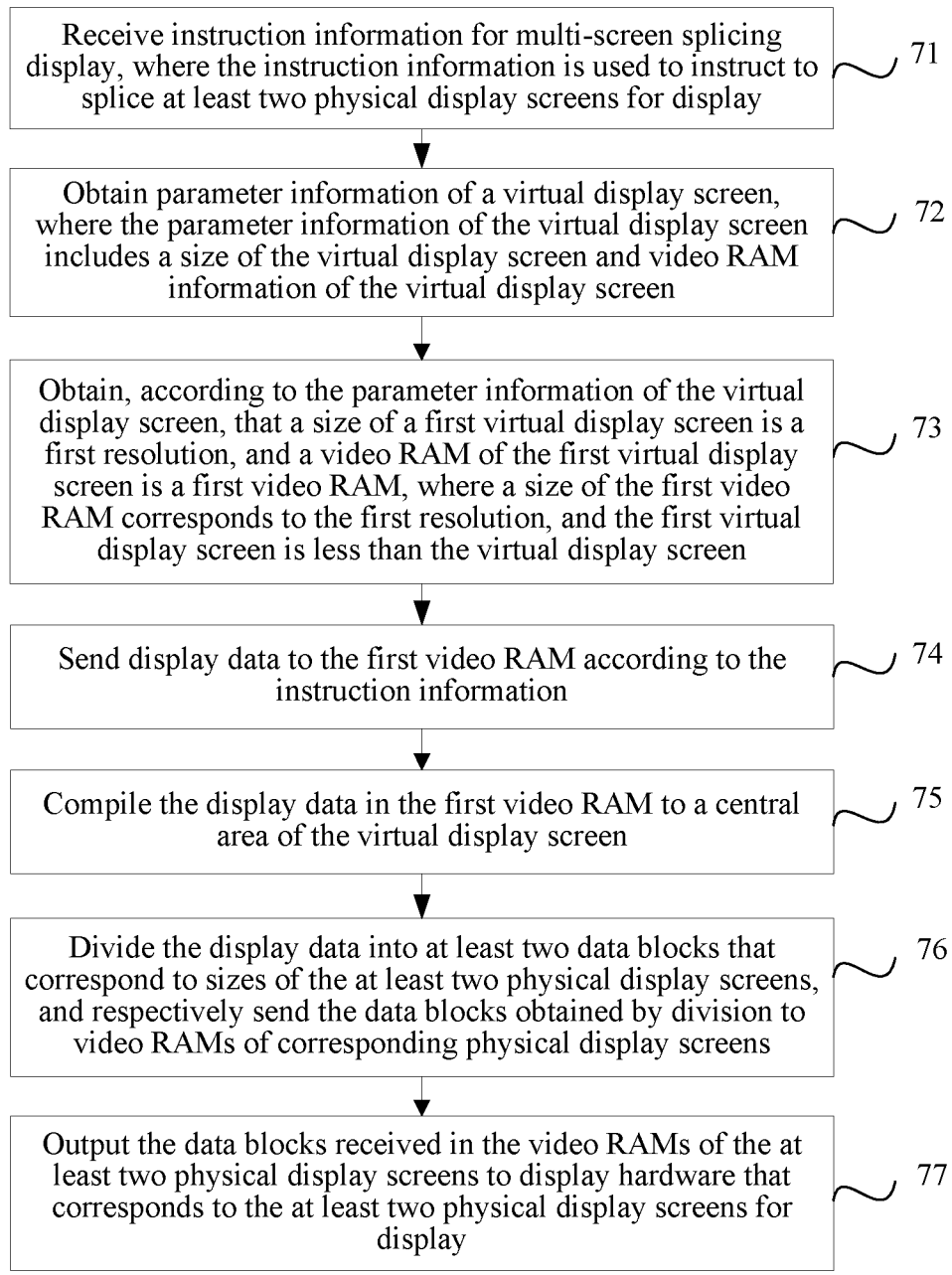
FIG. 7 is a flowchart of still another embodiment of a processing method for multi-screen splicing display according to the present invention.

FIG. 7 is a flowchart of still another embodiment of a processing method for multi-screen splicing display according to the present invention. The processing method for multi-screen splicing display provided in this embodiment further provides another possible implementation manner on the basis of the embodiments shown in FIG. 2 and FIG. 4, to achieve a better display effect when a display ratio of a virtual display screen in the foregoing embodiments does not satisfy a standard display ratio of an application program.

As shown in FIG. 7, the processing method for multi-screen splicing display provided in this embodiment includes:

Step 71. Receive instruction information for multi-screen splicing display, where the instruction information is used to instruct to splice at least two physical display screens for display.

Step 72. Obtain parameter information of a virtual display screen, where the parameter information of the virtual display screen includes a size of the virtual display screen and video RAM information of the virtual display screen.

Step 73. Obtain, according to the parameter information of the virtual display screen, that a size of a first virtual display screen is a first resolution, and a video RAM of the first virtual display screen is a first video RAM, where a size of the first video RAM corresponds to the first resolution, and the first virtual display screen is less than the virtual display screen.

Step 74. Send display data to the first video RAM according to the instruction information.

Step 75. Compile the display data in the first video RAM to a central area of the virtual display screen.

Step 76. Divide the display data into at least two data blocks that correspond to sizes of the at least two physical display screens, and respectively send the data blocks obtained by division to video RAMs of corresponding physical display screens.

Step 77. Output the data blocks received in the video RAMs of the at least two physical display screens to display hardware that corresponds to the at least two physical display screens for display.

In an actual application, a display ratio obtained by splicing multiple physical display screens may not satisfy a standard display ratio of an application program, and consequently, a display effect may not be ideal. For example, if sizes of two physical display screens are both 1024*768, a size of a virtual display screen obtained by means of splicing is 1536*1024. However, this is not a ratio of a standard display screen, and if the size is directly reported to an application program, most application programs may not support this display specification. Consequently, display cannot be implemented, or can be implemented by means of scaling, which may cause an undesirable display effect.

To make the display effect more ideal, in an example of an implementation manner, a data processing system obtains the size of the virtual display screen, and selects the first virtual display screen having a size closest to and less than a size of the virtual display screen according to the size of the virtual display screen, to perform transitional display. A resolution of the first virtual display screen is a standard display ratio. The system may allocate corresponding storage space for the first virtual display screen as a first video RAM according to the resolution of the first virtual display screen. For example, an actual size of the virtual display screen that is obtained by the system is 1536*1024, and a standard resolution size closest to and less than the actual size of the virtual display screen is WXGA+(1440*900), another video RAM area of 1440*900 may be created, and the standard resolution size and video RAM information corresponding to the standard resolution size are reported to an application program. The application program draws an image in the video RAM that corresponds to 1440*900, and compiles data to a central area of the virtual display screen (1536*1024) after the image is drawn.

Further, because the display ratio of the application program is less than a display ratio of the virtual display screen, in an example of an implementation manner, an area outside the central area of the virtual display screen may be set to a preset background. For example, the area outside the central area of the virtual display screen may be set to black or another color favored by a user, or the area outside the central area of the virtual display screen may be set to an eye-protection color, or may be set to a framework or another background favored by the user, or the like.

Specifically, preset background display data may be added to a video RAM that corresponds to the area outside the central area of the virtual display screen.

The following provides a detailed description by using an example in which the area outside the central area of the virtual display screen is set to black. The display data of the application program in the virtual display screen is:

$$[M \ N].$$

In this case, display data corresponding to black needs to be added to the video RAM that corresponds to the area outside the central area of the virtual display screen. Assuming that the display data that corresponds to black is B, the display data B is added to the video RAM that corresponds to the area outside the central area of the virtual display screen. Display data in the video RAM of the virtual display screen after adding may be expressed as:

$$\begin{bmatrix} B & B & B & B \\ B & M & N & B \\ B & B & B & B \end{bmatrix}.$$

Next, when the display screen A and the display screen B are spliced transversely for display, the display data in the video RAM of the virtual display screen is divided into two parts, data on the left side is copied to a video RAM that corresponds to the display screen A, and data on the right side is copied to a video RAM that corresponds to the display screen B.

It may be understood that a principle is the same when the display screen A and the display screen B are spliced longitudinally for display, or the area outside the central area of the virtual display screen is set to another background, and is not described in detail again in this embodiment.

In the processing method for multi-screen splicing display provided in this embodiment, when multiple screens are spliced for display, parameters reported to an application are changed into parameters of a virtual display screen, and a corresponding video RAM address is switched to a video RAM address of the virtual display screen, so that the application program can implement multi-screen splicing display for an image on the multiple screens. Further, by using an additionally applied first virtual display screen having a standard display ratio to perform transitional display, a display effect of the application program is more ideal.

Figure 8:
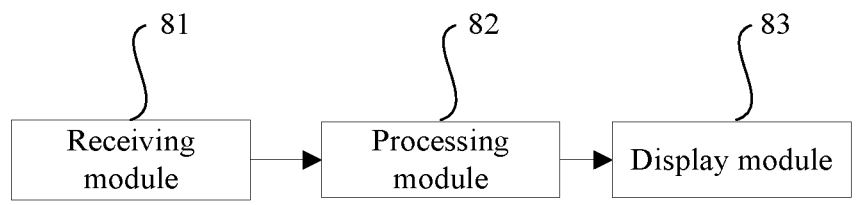
FIG. 8 is a schematic diagram of a processing device for multi-screen splicing display according to the present invention.

FIG. 8 is a schematic diagram of a processing device for multi-screen splicing display according to the present invention. As shown in FIG. 8, the processing device for multi-screen splicing display provided in this embodiment may implement each step of the processing method for multi-screen splicing display provided in the embodiments shown in FIG. 2, FIG. 4, and FIG. 7 of the present invention. The step is not described herein again.

The processing device for multi-screen splicing display provided in this embodiment includes a processor for multi-screen splicing display, and the processor specifically includes a receiving module 81, a processing module 82, and a display module 83.

The receiving module 81 is configured to: receive instruction information for multi-screen splicing display, where the instruction information is used to instruct to splice at least two physical display screens for display, and send the instruction information to the processing module.

The processing module 82 is configured to send, according to the instruction information, display data to a video RAM of a virtual display screen formed by splicing the at least two physical display screens, where a size of the video RAM of the virtual display screen corresponds to a size of the virtual display screen. The processing module is further configured to: divide the display data in the video RAM of the virtual display screen into at least two data blocks that correspond to sizes of the at least two physical display screens, and respectively send the data blocks obtained by division to video RAMs of corresponding physical display screens.

The display module 83 is configured to output the data blocks received in the video RAMs of the at least two physical display screens to display hardware that corresponds to the at least two physical display screens for display.

In an actual application, the receiving module 81 is further configured to: before the display data is sent, according to the instruction information, to the video RAM of the virtual display screen formed by splicing the at least two physical display screens, obtain parameter information of the virtual display screen, where the parameter information of the virtual display screen includes the size of the virtual display screen and video RAM information of the virtual display screen.

In an actual application, the video RAM may include a buffer. The processing module 82 is specifically configured to send the display data to the buffer sequentially according to a frame sequence of the display data.

Further, in an actual application, the foregoing buffer may include at least two buffer units, and the at least two buffer units have a same size. The processing module 82 is specifically configured to alternately send the display data that corresponds to each frame of the display data to the at least two buffer units according to the frame sequence of the display data.

In an actual application, the processing module 82 is further specifically configured to: determine any one of frame synchronization signals of the at least two physical display screens as a frame synchronization signal of the virtual display screen, and respectively send, according to the frame synchronization signal of the virtual display screen, each piece of display data in the at least two buffer units to a video RAM of a corresponding physical display screen.

Optionally, in an actual application, the processing module 82 is further specifically configured to: determine, in the frame synchronization signals of the at least two physical display screens, a frame synchronization signal with a higher frequency as the frame synchronization signal of the virtual display screen, and send, according to the frame synchronization signal of the virtual display screen, each piece of display data in the at least two buffer units to video RAMs of corresponding physical display screens.

In an example of an implementation manner, in an actual application, the receiving module 81 is further configured to obtain, according to the parameter information of the virtual display screen, that a size of a first virtual display screen is a first resolution, and a video RAM of the first virtual display screen is a first video RAM, where a size of the first video RAM corresponds to the first resolution, and the first resolution is less than that of the virtual display screen. The processing module 82 is specifically configured to: send the display data to the first video RAM, and compile the image data in the first video RAM to a central area of the virtual display screen.

Further, in an actual application, the processing module 82 is further configured to set an area outside the central area of the virtual display screen to a preset background.

Further, in an actual application, the processing module 82 is further specifically configured to add preset background display data to a video RAM that corresponds to the area outside the central area of the virtual display screen.

By using the processing device for multi-screen splicing display provided in this embodiment, when multiple screens are spliced for display, an application program can implement multi-screen splicing display for an image on the multiple screens. Further, display by the application program may be smoother, and a display effect is more ideal.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that: the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A processing method for a multi-screen splicing display, comprising:
   receiving instruction information for the multi-screen splicing display, wherein the instruction information is used to instruct to splice display data to be displayed on at least two physical display screens for display;
   alternately sending, according to the instruction information, display data to at least two buffer units of a buffer of a video RAM of a virtual display screen formed by splicing the display data to be displayed on the at least two physical display screens, wherein a size of the video RAM of the virtual display screen corresponds to a size of the virtual display screen;
   dividing the display data into at least two data blocks that correspond to sizes of the at least two physical display screens;
   determining a frame synchronization signal having a highest frequency among frame synchronization signals of the at least two physical display screens as a frame synchronization signal of the virtual display screen;
   respectively sending, according to the determined frame synchronization signal of the virtual display screen, the data blocks obtained by division to video RAMs of corresponding physical display screens from the display data sent to the at least two buffer units; and
   outputting the data blocks received in the video RAMs of the at least two physical display screens to display hardware that corresponds to the at least two physical display screens for display.

2. The method according to claim 1, before the alternatively sending, according to the instruction information, display data to the at least two buffer units of the buffer of the video RAM of the virtual display screen formed by splicing the display data to be displayed on the at least two physical display screens, further comprising:
   obtaining parameter information of the virtual display screen, wherein the parameter information of the virtual display screen comprises the size of the virtual display screen and video RAM information of the virtual display screen.

3. The method according to claim 2, after the obtaining parameter information of the virtual display screen, further comprising:
   obtaining, according to the parameter information of the virtual display screen, that a size of a first virtual display screen is a first resolution, and a video RAM of the first virtual display screen is a first video RAM, wherein a size of the first video RAM corresponds to the first resolution, and the first resolution is less than a resolution of the virtual display screen; and alternately sending, according to the instruction information, the display data to the at least two buffer units of the buffer of the video RAM of the virtual display screen comprises:
  alternately sending, according to the instruction information, the display data to at least two buffer units of a buffer of the first video RAM; and
  compiling the display data in the at least two buffer units of the buffer of the first video RAM to a central area of the virtual display screen.

4. The method according to claim 3, after the compiling the image display data in the first video RAM to the central area of the virtual display screen, further comprising:
  adding preset background display data to a video RAM that corresponds to an area outside the central area of the virtual display screen.

5. The method according to claim 1, wherein
  the at least two buffer units have a same size; and
  alternately sending, according to the instruction information, display data to the at least two buffer units of the buffer comprises alternately sending display data that corresponds to each frame of the display data to the at least two buffer units according to a frame sequence of the display data.

6. A processing device for a multi-screen splicing display, comprising:
  a non-transitory computer-readable storage medium configured to store instructions;
  a processor configured to execute the instructions stored in the non-transitory computer-readable storage medium to receive instruction information for the multi-screen splicing display, wherein the instruction information is used to instruct to splice display data to be displayed on at least two physical display screens for display,
    alternately send, according to the instruction information, display data to at least two buffer units of a buffer of a video RAM of a virtual display screen formed by splicing the display data to be displayed on the at least two physical display screens, wherein a size of the video RAM of the virtual display screen corresponds to a size of the virtual display screen, and
    divide the display data into at least two data blocks that correspond to sizes of the at least two physical display screens,
    determine a frame synchronization signal having a highest frequency among frame synchronization signals of the at least two physical display screens as a frame synchronization signal of the virtual display screen,
    respectively send, according to the determined frame synchronization signal of the virtual display screen, the data blocks obtained by division to video RAMs of corresponding physical display screens from the display data sent to the at least two buffer units; and
  a display module, configured to output the data blocks received in the video RAMs of the at least two physical display screens to display hardware that corresponds to the at least two physical display screens for display.

7. The device according to claim 6, wherein
  the processor is further configured to: before the display data is alternately sent, according to the instruction information, to the at least two buffer units of the buffer of the video RAM of the virtual display screen formed by splicing the display data to be displayed on the at least two physical display screens, obtain parameter information of the virtual display screen, and
  the parameter information of the virtual display screen comprises the size of the virtual display screen and video RAM information of the virtual display screen.

8. The device according to claim 7, wherein the processor is further configured to:
  after obtaining the parameter information of the virtual display screen, obtain, according to the parameter information of the virtual display screen, that a size of a first virtual display screen is a first resolution, and a video RAM of the first virtual display screen is a first video RAM, wherein a size of the first video RAM corresponds to the first resolution, and the first resolution is less than that of the virtual display screen, and
  alternately send, according to the instruction information, the display data to at least two buffer units of a buffer of the first video RAM, and compile the display data in the at least two buffer units of the buffer of the first video RAM to a central area of the virtual display screen.

9. The device according to claim 8, wherein the processor is further configured to add preset background display data to a video RAM that corresponds to an area outside the central area of the virtual display screen.

10. The device according to claim 6, wherein
  the at least two buffer units have a same size, and
  the processor is configured to alternately send, according to the instruction information, display data that corresponds to each frame of the display data to the at least two buffer units according to a frame sequence of the display data.

11. The device according to claim 6, wherein the processor is configured to:
  obtain a first resolution value of the virtual display screen according to a resolution value of each of the at least two physical display screens,
  determine whether the first resolution value is a supported display screen resolution value, and
  when the first resolution value is not the supported display screen resolution value, select a second resolution value as the size of the virtual display screen, the second resolution value being a supported display screen resolution value which is less than the first resolution value and closest to the first resolution value relative to other supported display screen resolution values.

12. The device according to claim 11, wherein the processor is further configured to allocate a storage space for the virtual display screen in the video RAM of the virtual display screen according to the second resolution value when the first resolution value is not the supported display screen resolution value.

* * * * *

UNITED STATES PATENT AND TRADEMARK OFFICE
CERTIFICATE OF CORRECTION

| | |
|---|---|
| PATENT NO. | : 10,403,237 B2 |
| APPLICATION NO. | : 15/618754 |
| DATED | : September 3, 2019 |
| INVENTOR(S) | : Lei Chen |

Page 1 of 1

It is certified that error appears in the above-identified patent and that said Letters Patent is hereby corrected as shown below:

In the Claims

Column 15, Line 12:
In Claim 4, after "compiling the" delete "image".

Column 15, Line 31:
In Claim 6, after "storage medium" delete "to" and insert -- to: --, therefor.

Signed and Sealed this
Twenty-first Day of January, 2020

Andrei Iancu
*Director of the United States Patent and Trademark Office*